J. Marquis,
Slop Sink.

No. 57,742.  Patented Sept. 4, 1866.

Witnesses,
Valentine Ward
C. Wm. Smith

Inventor,
John Marquis

UNITED STATES PATENT OFFICE.

JOHN MARQUIS, OF SAN FRANCISCO, CALIFORNIA.

IMPROVEMENT IN SLOP-HOPPERS.

Specification forming part of Letters Patent No. 57,742, dated September 4, 1866.

*To all whom it may concern:*

Be it known that I, JOHN MARQUIS, of the city and county of San Francisco, State of California, have invented certain new and useful Improvements in Slop-Hoppers, called "Marquis' Double-Trapped Slop-Hopper," for sinks and drains; and I do hereby declare the following description and accompanying drawings are sufficient to enable any person skilled in the art or science to which it most nearly appertains to make and use my said invention without further invention or experiment.

The nature of my invention or improvement consists in the employment of a stationary hopper, in which is placed a movable hopper, to be lifted out and emptied of the accumulated débris, when desired, the stationary hopper having traps near the top and bottom filled with water, to prevent the return of the effluvia from the sink or drain.

Figure 1:
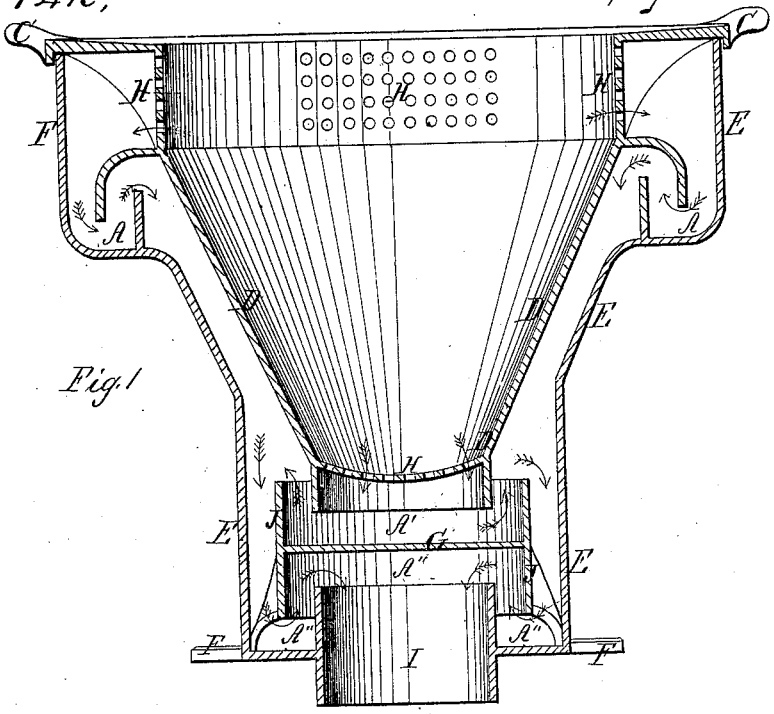
Figure 2:
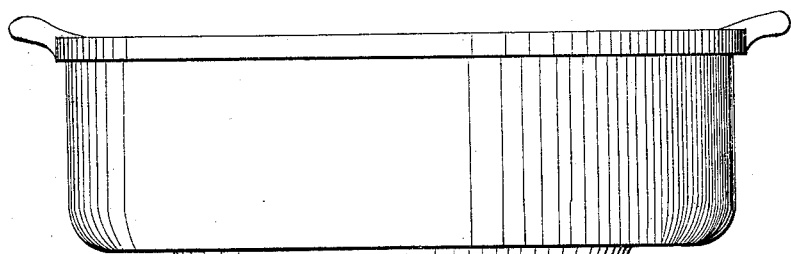

To enable others skilled in the art to make and use my slop-hopper, I will proceed to describe its construction and operation, as follows:

Referring to the drawings, Figure 1 is a sectional elevation; Fig. 2, a front elevation.

A and A', &c., are traps containing water, the upper one being formed by placing strips of metal around the inner casing or ledge of the hopper E, and around the inner hopper, D, which dips into the water in the trap A.

The lower trap consists of a pan, G, of metal or other material, having a rim or flange, J J, placed around it, which forms the lower trap, and in which the lower portion of the movable hopper, D D, is placed.

The pan G is placed upon arms or standards resting on the bottom of the outer hopper, sufficiently high to allow the water to freely pass off into the drain through the connection I, which extends upward, fitting loosely into the bottom of the bowl or pan.

The upper portion of the movable hopper, D D, around its entire circumference, as well as the lower portion near where it sets into the lower trap, is perforated, allowing the water to pass freely through the holes H H H in the direction of the arrows, into the lower trap, as well as over the upper trap, into the stationary hopper, and out into the drain I, through the hole.

For convenience' sake handles C C may be attached to the movable hopper.

My hopper may be constructed of iron or other material. If made of iron it may be galvanized. Copper may be used for constructing the inner hopper, D. The upper trap or band, A A, may be dispensed with entirely, as the lower recess or ledge will always be filled with water, which will then form a single-trapped hopper.

My invention may be made in any known form, square, round, or circular; of iron, copper, wood, or earthy material, and may be employed for urine-sinks, water-closets, and wash-bowls.

By this arrangement of slop-hoppers it is intended that no effluvia shall return from the drain or cess-pool.

The water being carried into the adjustable hopper passes out through the perforations H H, &c., and is carried downward in the direction of the arrows, filling the spaces A and A' around the ledges in the top and bottom, allowing the overflow to escape through the outlet I, while the noxious gases and effluvia are prevented from returning by the trap or traps; neither is the pipe choked by slops and débris, preventing the water from passing off.

Having thus described my improved slop-hopper, what I claim, and desire to secure by Letters Patent, is—

1. The construction and arrangement of the stationary hopper E E, and movable hopper D D, substantially as described, and for the purpose set forth.

2. The bowl or pan G A', or its equivalent, placed upon standards in the bottom of the lower ledge in the outer hopper, or attached to the inner hopper, D, and which forms, together with the lower portion of the movable hopper and the upper portion of the connection-pipe I, the trap A'' A'', substantially as described, and for the purpose set forth.

3. Arranging the inner hopper in the stationary or outer hopper, so as to form the upper trap, A, as herein specified, and for the purpose set forth.

In witness whereof I have hereunto set my hand and seal this 18th day of January, 1866.

JOHN MARQUIS. [L. S.]

Witnesses:
VALENTINE WARD,
C. W. M. SMITH.